United States Patent [19]

Neet et al.

[11] Patent Number: 4,505,973

[45] Date of Patent: Mar. 19, 1985

[54] ELECTRICALLY CONDUCTIVE RIGID POLYURETHANE FOAM

[75] Inventors: Thomas E. Neet, Grandview, Mo.; David A. Spieker, Olathe, Kans.

[73] Assignee: The United States of America as represented by the United States Department of Energy, Washington, D.C.

[21] Appl. No.: 559,502

[22] Filed: Dec. 8, 1983

[51] Int. Cl.³ .................. B32B 3/26; B32B 5/18; C08G 18/14; H01B 1/06

[52] U.S. Cl. .................. 428/317.9; 252/511; 428/68; 428/76; 428/304.4; 428/314.4; 521/99

[58] Field of Search .................. 252/511; 521/99; 428/68, 76, 304.4, 314.4, 317.9

[56] References Cited

U.S. PATENT DOCUMENTS

| | | | |
|---|---|---|---|
| 3,208,013 | 9/1965 | Walker et al. | 333/22 |
| 3,235,772 | 2/1966 | Gurin | 317/2 |
| 3,367,851 | 2/1968 | Filreis et al. | 204/2 |
| 3,401,141 | 9/1968 | Toth | 252/511 |
| 3,406,126 | 10/1968 | Litant | 252/511 |
| 3,486,967 | 12/1969 | Fisher | 521/99 |
| 3,499,848 | 3/1970 | Weisman | 521/99 |
| 3,512,183 | 5/1970 | Sharp et al. | 252/511 |
| 3,676,925 | 7/1972 | Sato et al. | 252/511 |
| 4,256,800 | 3/1981 | Stockhausen et al. | 428/96 |
| 4,282,329 | 8/1981 | von Bonin et al. | 521/99 |
| 4,286,004 | 8/1981 | Dahmen et al. | 428/95 |
| 4,301,040 | 11/1981 | Berbeco | 252/511 |
| 4,438,221 | 3/1984 | Fracalossi et al. | 521/99 |

OTHER PUBLICATIONS

Product News—Columbian Chemical Co., Tulsa, OK, 1 page, no date.
Bigg, Polymer Eng. & Sci., 17, No. 12, 842–847, (1977).
Bodnar et al., SPE, 37th Annual Tech. Conf., New Orleans, 762–765, (1979).
Bodnar et al., Modern Plastics, 57, 111–120, (1980).
Theberge et al., Plast. Chem. Prep., 38, 430–433, (1977).
Galli, Plastic Compounding, 22–23, (Mar./Apr. 1982).

Primary Examiner—Herbert S. Cockeram
Attorney, Agent, or Firm—Armand McMillan; Albert Sopp; Judson R. Hightower

[57] ABSTRACT

A rigid, polyurethane foam comprises about 2–10 weight percent, based on the total foam weight, of a carbon black which is CONDUCTEX CC-40-220 or CONDUCTEX SC, whereby the rigid polyurethane foam is electrically conductive and has essentially the same mechanical properties as the same foam without carbon black added.

13 Claims, No Drawings

ELECTRICALLY CONDUCTIVE RIGID POLYURETHANE FOAM

The U.S. Government has rights in this invention pursuant to Contract No. DE-AC04-76DP00613 between the U.S. Department of Energy and Bendix Corporation.

BACKGROUND OF THE INVENTION

This invention relates to an electrically conductive rigid polyurethane foam.

There are many polymeric materials in existence which are electrically conductive, often due to the incorporation of electrically conductive fillers. Included among these known materials are various carbon-filled polyurethane foams, such as the well known series 1900 VELOSTAT foams. However, all of these electrically conductive polyurethane foams are flexible.

For example, U.S. Pat. No. 3,406,126 discloses solid casting resins such as epoxy or fiberglass, made electrically conductive by incorporation therein of unwoven carbon yarn filaments. Such composites are useful in discharging static electricity buildup, for example. U.S. Pat. No. 3,235,772 also deals with solid elastomers useful as anti-static printer's blankets. The elastomer layer may comprise flexible polyurethane and is filled with conductive carbon black. U.S. Pat. No. 4,351,745 also relates to a solid elastomer filled with commercial conductive carbon black fillers. U.S. Pat. Nos. 4,256,800 and 3,367,851, deal only with the application of conductive coatings via aqueous media. U.S. Pat. No. 4,286,004 also deals with flexible polyurethane foams as anti-static carpet backing. On the other hand, U.S. Pat. No. 3,208,013 does relate to rigid polyurethane foams. However, the resultant composition is an insulator.

In general, these electrically conductive flexible polyurethane foams are made by a multi-step process, typically involving a leaching out of the foam cells with a caustic material followed by the application of a conductive coating to the remaining polymer struts. However, such methodology is not applicable to rigid polyurethane foams because of the closed nature of their cell structure.

There is also a large body of literature relating to the general use of materials such as carbon blacks, metal-coated substrates such as glass beads, etc. as fillers for polymeric materials whereby the latter are rendered conductive. However, in no case has this been attempted with rigid polyurethane foams. See, e.g., Bigg, *Polymer Engineering and Science*, December 1977, Volume 17, No. 12, 842–847; Bodnar et al., SPE, 37th Annual Tech. Conference, New Orleans, LA, May 7–10, 1979, published by SPE, Greenwich, Conn., 1979, pp. 762–765; Bodnar et al., Mod. Plast., Volume 57, January 1980, 111–120; Theberge et al., American Chemical Society, Division of Org. Coat. Plast, Chem. Prepr., Volume 38, 175th National Meeting of ACS, Anaheim, CA, Mar. 12–17, 1978, published by American Chemical Society, Div. Org. Coat. Plast. Chem., Washington, D.C., 1977, 430–433; McGraw, H. R. and Hood, W. L., Mound Laboratory, Miamisburg, Ohio, Dec. 30, 1975, Contract: E-33-1-GEN-53, MLM-2192, NTIS; and Galli, Plastics Compounding, March/April 1982, 22–32.

In very many of these applications, serious problems can be encountered in the incorporation of a given filler in a given polymer, often because of an undesired deterioration of mechanical and other important polymer properties. Hence, there is no substantial predictability a priori of the acceptability of the incorporation of such a filler in a given polymer.

Although the electrically conductive flexible polyurethane foams are adequate for many applications, there are significant situations in which they are not sufficient and in which rigid polyurethane foams are needed. One important such application involves the use of rigid polyurethane foam in molded form as structural packaging material for sensitive electrical components. In conventional applications, e.g., computer-related products, such packaged components are not susceptible to electrostatic damage since the individual components form a large assembly and constitute one or more major circuits, each of which is grounded to the cabinet or chassis of the device. However, there are other applications, e.g., weapon devices, where certain parts and assemblies are isolated and do not become part of a major circuit until the weapon is actually ready to be fired. Hence, they cannot be protected from electrostatic damage as easily as the integrated circuits in computers as mentioned above.

SUMMARY OF THE INVENTION

Accordingly, it is an object of this invention to provide electrically conductive rigid polyurethane foams.

It is another object of this invention to provide a simple method for preparing such a foam which has minimal impact on conventional polymerization methods.

It is a further object of this invention to provide improved packaged electrical components which are protected against static charge buildup.

Upon further study of the specification and appended claims, further objects and advantages of this invention will become apparent to those skilled in the art.

These objects have been attained by incorporating appropriate carbon blacks into rigid polyurethane foams. This is preferably accomplished by simply mixing appropriate amounts of the carbon black with each of the two components used to prepare the rigid foam.

DETAILED DISCUSSION

The carbon black useful in this invention is preferably CONDUCTEX CC-40-220 or CONDUCTEX SC (Columbia Chemical Company). Of course, equivalent carbon blacks can be utilized, e.g., those having a ratio of nitrogen-determined total surface area to CTAB-determined surface area equal to or greater than about 1.5, e.g., 1.5–3, preferably 1.5–2. The methods of determining the surface area using gaseous nitrogen or using CTAB (cetyltrimethylammonium bromide) are fully conventional and well known in the art. In essence, the gaseous nitrogen approach measures the total surface area of the porous particles while the CTAB liquid-based method measures a lower percentage of this total. Carbon blacks having the necessary ratio of surface areas will have appropriate wetting characteristics to ensure that the necessary viscosity and other properties of the polyurethane components and foam will be maintained. In addition, equivalent carbon blacks will have particle size distributions such that 90 weight percent of the particles will have diameters less than 30 $\mu$m, preferably 10–30 $\mu$m, most preferably 10–20 $\mu$m. Such carbon blacks are well known and, typically, are those which are made from acetylene. The carbon blacks used in this invention are not chemically modified. It is to be noted that familiar carbon blacks, such as lamp blacks, are not appropriate for use in this invention.

In general, the amount of carbon black to be incorporated into the polyurethane, based on the total weight of the polyurethane is about 2–10 weight percent. Amounts less than about 2 weight percent do not provide the necessary electrical conductivity; amounts greater than about 10 weight percent significantly increase the risk that an unacceptable deterioration in rigid foam properties will result or that unacceptable difficulties in materials handling will ensue.

In preparing the electrically conductive rigid polyurethane foam of this invention, it is preferred that approximately equal amounts of the total amount of carbon black be homogeneously mixed with each of the two components used to prepare the polyurethane and that the carbon black-containing mixtures then be fully conventionally reacted. It is also possible to first mix the two conventional components and then, after partial reaction, to add the carbon black; but this is significantly less preferred.

This invention is applicable to all conventional rigid polyurethane foams having molded densities greater than about 10 lb/ft$^3$, e.g., 10–35 lb/ft$^3$.

Unless indicated otherwise herein, all details of the preparation of the electrically conductive rigid polyurethane foams of this invention are in accordance with fully conventional procedures normally employed in conjunction with the preparation of the non-conductive rigid polyurethane foams. These are fully discussed in the literature.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following example, all temperatures are set forth uncorrected in degrees Celsius; unless otherwise indicated, all parts and percentages are by weight.

EXAMPLE 1

An electrically conductive rigid polyurethane foam was prepared by mixing 5% (based on the total weight of the final polyurethane) of CONDUCTEX CC-40-220 into the individual resin and isocyanate components of the foam system described below:

Resin Component 100.00 parts by weight of polyoxypropylene derivative of pentaerythritol, containing four secondary hydroxyl groups, each bonded to a central carbon atom by an oxyalkylene chain; average molecular weight 405, hydroxyl number 555.
0.36 parts by weight catalyst containing 1 part by weight triethylenediamine (1,4 diazabicyclo[2.2.2]octane) and 2 parts by weight dipropylene glycol.
0.35 parts by weight water.
0.27 parts by weight N-coco morpholine.
0.07 parts by weight tetramethylethylenediamine.

Isocyanate Component 146.64 parts by weight toluene diisocyanate/polyester prepolymer, made by reacting trimethylolpropane adduct of epsilon-caprolactone with toluene diisocyanate.

Two grams of the CONDUCTEX carbon black mentioned above was homogeneously mixed with 40 grams of the isocyanate component to obtain a homogeneous blend. Two grams of CONDUCTEX were also mixed with 40 grams of the resin component described above to achieve a homogeneous blend. Both mixtures were than blended together in a weight ratio of resin component to isocyanate component of 40.8/59.2. The blending was continued for 70 seconds using a 2 inch single Conn mixing blade in a ½ pint paper cup. After the 70 second mixing period, the reaction product was spooned into a 6 in.×6 in.×1 in. mold which was then capped. After standing for 10 minutes, the mold was placed into a convection oven at 121° C. for 3 hrs. Five cylindrical plugs were than cut from the cured mold. Each had a volume of 1 cubic inch. They were cut in the direction perpendicular to the foam rise. The flat surfaces at both ends of the plugs were coated with electrolytic paste. Copper electrodes (2 in.×2 in.×0.25 in.) were attached to each end. To ensure good surface contact, weight was applied to each end. Resistance was then measured conventionally. Volume resistivities as low as $10^3$ ohms were recorded, the general range being $10^3$–$3\times10^5$ ohms. This is a highly significant improvement from the unmodified rigid polyurethane foam which has a volume resistivity of about $10^{13}$ ohms.

It is theorized that the mechanism of electrical conduction involves the embedding of the carbon powder in the foam matrix thereby providing a continuous pathway for electric current. The resultant electrically conductive rigid foam products are highly advantageous because the foam retains its highly useful properties including high strength-to-weight ratio, ability to hold dimensional tolerances, mold-to-size capability, potential for density variation, versatility in application, etc.

The preceding example can be repeated with similar success by substituting the generically or specifically described reactants and/or operating conditions of this invention for those used in the preceding example. From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a rigid, polyurethane foam, the improvement wherein the foam further comprises about 2–10 weight percent, based on the total foam weight, of a carbon black which has a ratio of nitrogen-determined surface area to CTAB-determined surface area of about 1.5–3 and a particle size distribution wherein at least 90 weight percent of the particles are of a size of 10–30 μm, whereby the rigid polyurethane foam is electrically conductive and has essentially the same mechanical properties as the same foam without carbon black added and wherein the rigid polyurethane foam has a density of greater than about 10 lb/ft$^3$.

2. A rigid polyurethane foam of claim 1, wherein the amount of carbon black is about 5 weight percent.

3. A rigid polyurethane foam of claim 1, wherein the carbon black has a nitrogen to CTAB surface area ratio of about 2.1, and a particle diameter of 18 μm.

4. A rigid polyurethane foam of claim 2, wherein the carbon black has a nitrogen to CTAB surface area ratio of about 2.1, and a particle diameter of 18 μm.

5. A rigid polyurethane foam of claim 1, wherein the foam has a density of about 10–35 lb/ft$^3$.

6. A rigid polyurethane foam of claim 1, wherein said ratio of surface areas is 1.5–2.

7. A rigid polyurethane foam of claim 1, wherein at least 90 weight percent of said particles are of a size of 10–20 μm.

8. A rigid polyurethane foam of claim 2, wherein said ratio of surface areas is 1.5–2.

9. A rigid polyurethane foam of claim 2, wherein at least 90 weight percent of said particles are of a size of 10–20 μm.

10. A rigid polyurethane foam of claim 6, wherein at least 90 weight percent of said particles are of a size of 10–20 μm.

11. A rigid polyurethane foam of claim 1, which has been prepared by mixing a portion of the total amount of carbon black to be included in the polyurethane, with the isocyanate component used to prepare the polyurethane, mixing the remaining portion of the total amount of carbon black with the resin prepolymer component used to prepare the polyurethane, and then reacting the two components to prepare a rigid polyurethane foam.

12. In an electrical component surrounded by a rigid polyurethane foam, the improvement wherein said foam is the electrically conductive rigid polyurethane foam of claim 1.

13. A method of protecting an electrical component from the effects of static charge buildup, comprising surrounding the electrical component with the rigid polyurethane foam of claim 1.

* * * * *